United States Patent
Boulos et al.

(10) Patent No.: US 6,596,660 B1
(45) Date of Patent: Jul. 22, 2003

(54) AMBER-FREE REDUCED BLUE GLASS COMPOSITION

(75) Inventors: Edward Nashed Boulos, Troy, MI (US); James Victor Jones, Nashville, TN (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/074,626

(22) Filed: Oct. 26, 2001

(51) Int. Cl.⁷ .............................. C03C 3/087; C03B 5/16
(52) U.S. Cl. ........................... 501/70; 501/71; 65/134.3
(58) Field of Search ....................... 501/70, 71; 65/99.1

(56) References Cited

U.S. PATENT DOCUMENTS

| | | | |
|---|---|---|---|
| 1,961,603 A | 6/1934 | Berger | 501/47 |
| 2,505,001 A | 4/1950 | Nordberg | 65/31 |
| 3,343,935 A | 9/1967 | Keefer et al. | 65/121 |
| 3,345,190 A | 10/1967 | Albinak et al. | 501/70 |
| 3,486,874 A | 12/1969 | Rough | 65/146 |
| 3,578,430 A | 5/1971 | Labrot | 65/157 |
| 3,779,733 A | 12/1973 | Janakirama-Rao | 65/32 |
| 3,951,635 A | 4/1976 | Rough, Sr. | 65/146 |
| 3,971,646 A | 7/1976 | Rhodes | 65/157 |
| 4,104,076 A | 8/1978 | Pons | 501/66 |
| 4,381,934 A | 5/1983 | Kunkle et al. | 65/135 |
| 4,493,557 A | 1/1985 | Nayak et al. | 366/300 |
| 4,519,814 A | 5/1985 | Demarest, Jr. | 65/27 |
| 4,529,428 A | 7/1985 | Groetzinger | 65/27 |
| 4,539,034 A | 9/1985 | Hanneken | 65/134 |
| 4,610,711 A | 9/1986 | Matesa et al. | 65/134 |
| 4,701,425 A | 10/1987 | Baker et al. | 501/70 |
| 4,738,938 A | 4/1988 | Kunkle et al. | 501/72 |
| 4,792,536 A | 12/1988 | Pecoraro et al. | 501/70 |
| 4,866,010 A | 9/1989 | Boulos et al. | 501/71 |
| 5,013,487 A | 5/1991 | Cheng | 252/587 |
| 5,077,133 A | 12/1991 | Cheng | |
| 5,112,778 A | 5/1992 | Cheng et al. | 501/31 |
| 5,214,008 A | 5/1993 | Beckwith et al. | 501/69 |
| 5,240,886 A | 8/1993 | Gulotta et al. | 501/70 |
| 5,308,805 A | 5/1994 | Baker et al. | 501/71 |
| 5,318,931 A | 6/1994 | Nakaguchi et al. | 501/64 |
| 5,320,986 A | 6/1994 | Taniguchi et al. | 501/70 |
| 5,344,798 A | 9/1994 | Morimoto et al. | 501/70 |
| 5,346,867 A | 9/1994 | Jones et al. | 501/71 |
| 5,352,640 A | 10/1994 | Combes et al. | 501/71 |
| 5,362,689 A | 11/1994 | Morimoto et al. | 501/70 |
| 5,385,872 A | 1/1995 | Gulotta et al. | |
| 5,393,593 A | 2/1995 | Gulotta et al. | 428/220 |
| 5,411,922 A | 5/1995 | Jones | 501/71 |
| 5,478,783 A | 12/1995 | Higby et al. | |
| 5,521,128 A | 5/1996 | Jones et al. | 501/27 |
| 5,523,263 A | 6/1996 | Penrod | |
| 5,558,942 A | 9/1996 | Itoh et al. | 428/426 |
| 5,582,455 A | 12/1996 | Casariego et al. | 296/146.2 |
| 5,593,929 A | 1/1997 | Krumwiede et al. | 501/70 |
| 5,610,107 A | 3/1997 | Danielson et al. | 501/54 |
| 5,641,716 A | 6/1997 | Higby et al. | |
| 5,688,727 A * | 11/1997 | Shelestak et al. | 501/170 |
| 5,700,579 A | 12/1997 | Jeanvoine et al. | |
| 5,723,390 A | 3/1998 | Kijima et al. | 501/70 |
| 5,726,109 A | 3/1998 | Ito et al. | 501/71 |
| 5,747,398 A | 5/1998 | Higby et al. | 501/66 |

(List continued on next page.)

FOREIGN PATENT DOCUMENTS

| | | |
|---|---|---|
| EP | WO 95/16641 | 6/1995 |
| EP | 0 527 487 B1 | 11/1996 |
| EP | WO 99/02461 | 1/1999 |
| EP | WO 99/02462 | 1/1999 |
| EP | 0 996 598 B1 | 10/2001 |
| EP | WO 01/98221 A1 | 12/2001 |
| JP | 60-215546 | 10/1985 |
| JP | 61-136936 | 6/1986 |

OTHER PUBLICATIONS

Glass Science and Technology, 2—Colour Generation and Control in Glass, by C.R. Bamford Elsevier Scientific Publishing Company Amsterdam–Oxford–New York 1977; pp. 35, 36, 78, 79, 106,107,108, 109 142,143, 144, 145, 146.

Journal of the Society of Glass Technology—XXIV. The Colour of Iron–Containing Glasses of Varying Composition, By Gordon f. Brewster and Norbert J. Kreidl (Bausch and Lomb Optical Co, Rochester, New York)—pp. 332–371 (pp. 372–373 missing) and continues from pp. 474–405 No Date Available.

Journal of the Optical Society of America—vol. 38, No. 6, Jun. 1948 Entitled "Color Variations in Glasses Containing Iron" By John W. Forrest, Norbert J. Freidl and Tyler G. Pett, Bausch and Lomb Optical Company, Rochester 2, New York (Jun. 1948)—pp. 554–560.

Coloured Glasses, By Woldemar A. Weyl, Published By The Society of Glass Technology, "Elmfield", Northumerland Road, Sheffield, IO 1951—Chapter VII, The Colours Produced By Iron; pp. 90–120; Chapter XVII, The Colours Produced by Sulphur and its Compoungs, pp. 238–281. 1951.

Primary Examiner—David Sample
Assistant Examiner—Elizabeth A Bolden
(74) Attorney, Agent, or Firm—Brinks Hofer Gilson & Lione

(57) ABSTRACT

The present invention is a blue soda-lime-silica glass composition. The composition comprises 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, and colorants comprising: 0.3 to 0.8 wt. % total iron oxide as $Fe_2O_3$ wherein the ratio of FeO/total Fe as $Fe_2O_3$ is 0.35 to 0.62; 0.05 to 0.5 wt. % manganese compound as $MnO_2$, 0 to 0.30 wt. % titanium oxide as $TiO_2$; and 0 to 0.8 wt. % cerium oxide as $CeO_2$. The colored glass has the following spectral properties at 4.0 mm. thickness: 65 to 81% light transmittance using Illuminant A (LTA) and using Illuminant C has a dominant wavelength of 488 to 494 nanometers with an excitation purity of 4 to 11%.

18 Claims, No Drawings

U.S. PATENT DOCUMENTS

| | | | |
|---|---|---|---|
| 5,776,845 A | 7/1998 | Boulos et al. | 501/70 |
| 5,776,846 A | 7/1998 | Sakaguchi et al. | 501/70 |
| 5,780,372 A | 7/1998 | Higby | |
| 5,807,417 A * | 9/1998 | Boulos et al. | 501/71 |
| 5,830,812 A | 11/1998 | Shelestak et al. | 501/71 |
| 5,851,940 A | 12/1998 | Boulos et al. | 501/71 |
| 5,858,894 A | 1/1999 | Nagashima et al. | 501/64 |
| 5,877,102 A | 3/1999 | DuPont et al. | 501/71 |
| 5,877,103 A | 3/1999 | Dupont et al. | 501/71 |
| 5,888,917 A | 3/1999 | Kawaguchi et al. | 501/70 |
| 5,897,956 A | 4/1999 | Kijima et al. | 428/426 |
| 5,908,794 A | 6/1999 | Maeda et al. | 501/70 |
| 5,932,502 A | 8/1999 | Longobardo et al. | 501/70 |
| 5,952,255 A | 9/1999 | Seto et al. | 501/71 |
| 5,977,002 A | 11/1999 | Boulos et al. | 501/71 |
| 5,985,780 A | 11/1999 | Alvarez | |
| | | Casariego et al. | 501/71 |
| 6,017,837 A | 1/2000 | Nagashima et al. | |
| 6,046,122 A | 4/2000 | Nagashima et al. | |
| 6,071,840 A | 6/2000 | Sasage et al. | |
| 6,103,650 A | 8/2000 | Krumwiede | |
| 6,150,028 A | 11/2000 | Mazon | 428/426 |
| 6,218,323 B1 | 4/2001 | Bretschneider et al. | 501/71 |
| RE37,328 E | 8/2001 | Pecoraro et al. | 501/70 |
| 6,313,052 B1 | 11/2001 | Nakashima et al. | 501/69 |
| 6,313,053 B1 | 11/2001 | Shelestak | 501/71 |
| 2001/0018393 A1 | 8/2001 | Nagashima et al. | 501/64 |
| 2001/0021685 A1 | 9/2001 | Sakaguchi et al. | 501/64 |
| 2001/0034295 A1 | 10/2001 | Seto et al. | 501/71 |
| 2002/0025899 A1 | 2/2002 | Higby et al. | 501/71 |
| 2002/0058579 A1 | 5/2002 | Seto et al. | |

* cited by examiner

AMBER-FREE REDUCED BLUE GLASS COMPOSITION

TECHNICAL FIELD OF THE INVENTION

The invention is directed to a blue glass composition and method of producing; a blue glass with an improved infrared absorption.

BACKGROUND OF THE INVENTION

It would be extremely advantageous to improve the infrared absorption of glass products while maintaining a high level of visible transmission and to also have a good absorption in the ultraviolet portion of the spectrum. As is well known in the art, iron oxide is commonly used to provide a green color to glass. Iron oxide exists in two chemical forms in the glass, an oxidized form which is yellow: $Fe_2O_3$, and a reduced form which is blue FeO. Advantageously, the oxidized form of iron oxide absorbs a portion of the ultraviolet light passing through the glass product and the reduced form of iron oxide absorbs a portion of the infrared light passing through the glass product. Under typical furnace firing conditions arid batching conditions, when the total iron oxide in the glass product is within the range of about 0.3 to 0.8 wt. % as $Fe_2O_3$, the iron oxide equilibrium is such that the redox ratio of FeO/total Fe as $Fe_2O_3$ is about 0.23–0.26.

It is desirable to increase the proportion of reduced iron oxide (FeO) in the glass to improve its infrared absorption. In addition, by shifting the iron oxide away from the oxidized form ($Fe_2O_3$) the glass will change color from green to blue. The total iron oxide concentration may be decreased to maintain a high visible transmittance of the glass as the reduced iron absorbs more in the visible portion of the spectrum than the oxidized iron.

One way commonly employed to shift the redox equilibrium of iron oxide in the glass, and hence its UV and IR properties, is by increasing the fuel to the furnace. Increasing the amount of fuel, however, has several undesirable consequences: the combustion heating of the furnace becomes inefficient and requires an air increase or the unburnt fuel will burn in the checker system of the furnace. Excess fuel can also reduce the glass to an amber color that sharply lowers the visible transmittance of the glass product.

An amber color arises when the iron reacts with sulfur that has been reduced to form iron sulfide. Amber colored glass containers are normally melted in like manner by using anthracite coal together with iron oxide and sulfate. The amber iron sulfide chromophore, once produced, significantly decreases the visible transmittance of the glass and the glass could not be used where a high transmittance is required.

Therefore, there is a need in the glass industry to produce amber free blue glass that has high transmittance yet having an improved infrared light absorption and an ultra violet absorption.

SUMMARY OF THE INVENTION

The present invention is a blue soda-lime-silica glass composition that is heat absorbing. The composition comprises 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, and colorants consisting essentially of: 0.3 to 0.8 wt. % total iron oxide as $Fe_2O_3$ wherein the ratio of FeO/total Fe as $Fe_2O_3$ is greater than 0.35 but less than 0.62; 0.05 to 0.5 wt. % manganese compound as $MnO_2$; 0 to 0.30 wt. % titanium oxide as $TiO_2$, and 0 to 0.8 wt. % cerium oxide as $CeO_2$.

Glass products made according to the embodiment of the invention have the following spectral properties at 4.0 mm. Thickness 65 to 81% light transmittance using Illuminant A (LTA) and using Illuminant C has a dominant wavelength greater than 488 but less than or equal to 494 nanometers with an excitation purity greater than 4 and less than 11%. Generally, as the quantities of the colorants increase, both the % LTA and % IR transmittance will go down. Similarly, as the glass thickness increases for a given glass composition, the transmittance of the thicker glass will decrease.

DETAILED DESCRIPTION OF THE PREFERRED EMBODIMENT

Flat soda-lime-silica glass, used in the automotive and architectural industries and conveniently made by the float glass process, is generally characterized by the following basic composition, the amounts of the components being based on a weight percentage of the total glass composition:

TABLE I

| Base Glass Components | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The blue glass composition of the present invention employs this basic soda-lime-silica glass composition wherein, additionally, CaO+MgO is 6 to 15 wt. % and $Na_2O+K_2O$ is 10 to 20 wt. %. Preferably $SO_3$ is 0.02 to 0.20 wt. %, more preferably 0.02 to 0.10 wt. %. In addition, the blue glass composition consists essentially of the following coloring components: iron oxide; manganese compound; and optionally any of titanium dioxide or cerium oxide or both.

The total iron oxide as $Fe_2O_3$ present in the invention composition in quantities of 0.3 to 0.8 wt. % $Fe_2O_3$. Typically, this ingredient is added with the batch ingredients in the oxide form, $Fe_2O_3$. The iron oxide incorporated in the composition lowers both the ultraviolet and the infrared transmittance of the glass products. When iron is used in a glass composition in normal commercial production, the redox ratio defined as equal to FeO/total Fe as $Fe_2O_3$ is 0.23–0.26, while glass of the invention has a higher redox ratio of 0.35–0.62. If the redox ratio goes above 0.62, the undesirable amber chromophore may form.

The most important factor of glass of the invention is the one step batch admixing of the components to feed a conventional siemens float glass furnace. Sodium sulfate is mixed in the batch together with anthracite coal to shift the iron oxide equilibrium toward the reduced form of iron. Manganese dioxide is necessary in the batch to prevent the formation of the amber iron sulfide. All of the batch components are mixed together in a single step and then metered into the furnace. The glass product made with this method becomes blue and the infrared absorption of the product is measurably improved. When glass products made in this manner are used in vehicles, the blue glass absorbs solar heat and there is less total heat build up in the vehicle. The load on vehicle air conditioners is reduced such that there is less heat build up to cool and comfort to the passengers occurs quickly. Glass made with the instant invention can also be used for architectural products and provides a similar reduction in air conditioner load.

A manganese compound is present in an amount of 0.05 to 0.5 wt.% based on $MnO_2$ in the blue glass invention composition to prevent the formation of the amber color. This manganese compound can be added to the batch glass components in a variety forms, e.g., but not limited to $MnO_2$, $Mn_3O_4$, $MnO$, $MnCO_3$, $MnSO_4$, $MnF_2$, $MnCl_2$, etc.

Table II discloses the amounts of raw material batch ingredients that are preferably used to form the embodiments of blue glass compositions according to the present invention.

TABLE II

| Batch Material | Range Mass (Lbs) |
| --- | --- |
| Sand | 1000 |
| Soda Ash | 290 to 350 |
| Limestone | 70 to 90 |
| Dolomite | 215 to 260 |
| Salt cake | 5 to 15 |
| Rouge (97% $Fe_2O_3$) | 3.5 to 11.5 |
| Manganese Dioxide | 0.65 to 6.5 |
| Titanium Dioxide | 0 to 4.2 |
| Cerium Oxide | 0 to 11.5 |
| Anthracite coal | 1 to 2.5 |
| Nepheline Syenite | 0 to 150 |

CARBOCITE is anthracite coal from the Shamokin Filler Company. Graphite could be used as a substitute for anthracite coal in an amount of about 70% that of anthracite coal because anthracite coal contains about 70–72% carbon, the typical range would be from 0.7 to 2.1 pounds of graphite per 1000 pounds of sand. MELITE, a coal slag processed by Calumite Corporation could partially or wholly substitute for rouge in the batch up to about 55 pounds Melite per 1000 pounds of sand. MELITE has about 80% of the total iron oxide in the reduced form and thus would require less anthracite coal to generate similar spectral properties.

The equilibrium reactions that occur in the glass melt which cause a shift in the forms of iron oxide are included by the sodium sulfate used as a refining agent and carbon used to react with sodium sulfate at lower furnace temperatures. Generally, increasing the quantity of sodium sulfate in the glass tends to shift the iron oxide equilibrium slightly toward oxidizing while increasing carbon concentration in the glass batch shifts the iron oxide equilibrium toward reducing. Another influence on the iron oxide equilibrium is the peak furnace temperature which when increased will shift the iron oxide slightly toward the reduced state and lowering overall furnace temperature allows the iron oxide to shift toward the oxidized state.

Melts were made in the laboratory which demonstrate embodiments of this invention using the procedure as follows: 2" inside diameter and dry mixed for 10 minutes each on a Turbula mixer, dry batch was placed into an 80% platinum 20% rhodium crucible that stands 2" tall and has an inside diameter at the top of 2.5" and is tapered to the base which has an inside diameter of 1.75". An amount of 4.5 ml. of water is added to the dry batch in the crucible and mixed with a metal spoon. After such preparation, a group of six different batches is melted in a gas/air fired surface at the same time for 1 hour at 2600° F. and each crucible is removed in turn from the furnace and fritted. Fritting the glass involves coating the inside of the platinum/rhodium crucible by rolling the molten, glass around the inside of the crucible and then plunging the crucible into cold water. After removing, the crucible from the water and draining, the broken glass particles are removed from the sides of the crucible and mechanically mixed inside the crucible. All six samples are fritted in like manner and all crucibles are placed back into the furnace for another hour interval at 2600° F. and the fritting procedure is repeated. After the second fritting process, the crucibles are returned to the furnace for 4 hours at 2600° F. Each crucible is removed in turn from the furnace and each molten glass sample is poured into a graphite mold with an inside diameter of 2.5". Each glass is cooled slowly, labeled, and placed into an annealing furnace where the temperature is quickly raised to 1050° F., held for 2 hours, and then slowly cooled by shutting off the furnace and removing the samples after 14 or more hours. The samples are ground and polished to about 4.0 mm. thickness and subsequently the spectral properties are measured for each sample.

All of the examples are made using the above batch only with no cullet (the broken pieces of glass that are added to the batch feed in production). There are two types of cullet that can be added to the batch to produce glass of the invention: reduced iron blue glass from glass of the invention and oxidized iron green glass. The reduced iron blue glass cullet has a redox ratio of about, 0.5 to 0.6 while the oxidized iron green glass has a redox ratio of about 0.25. The redox ratio is defined as the ratio of wt. % FeO/total Fe as wt. % $Fe_2O_3$. For example, if the desired glass of the invention uses 2 pounds of anthracite coal for 1000 pounds of sand, then an additional 1.5 pounds of anthracite coal must be added to the batch when the reduced iron blue glass cullet is added to make 50% of the batch feed to the furnace for a total of 3.5 pounds of anthracite coal per 1000 pounds of sand. For other cullet levels, the anthracite coal is increased or decreased proportionately. If the oxidized iron green glass cullet is used, more anthracite coal must be added to drive the oxidized cullet toward the reduced iron blue color. For example, if the desired glass of the invention uses 2 pounds of anthracite coal for 1000 pounds of sand, then an additional 2.5 pounds of anthracite coal must be added to the batch when the oxidized iron green glass cullet is added to make 50% of the batch feed to the furnace for a total of 4.5 pounds of anthracite coal per 1000 pounds of sand. When other reductants are used, they must be adjusted proportionately as the anthracite coal in the examples.

All laboratory melts made with above procedure use a base composition of 100 grams sand, 32.22 grams soda ash, 8.81 grams limestone, 23.09 grams dolomite, 0.5 to 2.0 grams of sodium sulfate, 0.1 to 0.25 grams of CARBOCITE, 2.64 grams of nepheline syenite, and the remainder of the batch includes rouge, manganese dioxide, and titanium dioxide and cerium oxide, if required.

In each of the following tables of examples with the glass composition includes spectral data at 4.0 mm., which is the control thickness. Some tables include thickness other than 4.0 mm. where the most preferred embodiment of the instant invention is with the % LTA greater than or equal to 70.0% and the TSET is less than or equal to 40.0%.

Table III below shows the improvement to infrared absorption by increasing anthracite coal and improvement in ultra violet absorption by increasing manganese dioxide. Glasses made with the same batch concentrations, but without anthracite coal are green and do not have the level of infrared absorption; this would put those glasses outside the scope of this invention. Glasses made without manganese dioxide develop the amber color and the transmittance is significantly lower. Example 1 demonstrates the amber glass generated when manganese dioxide is removed from the batch components. This is compared to Example 3 with manganese added to the glass. Example 1 is not included in glass of this invention and is used only to illustrate the difference in transmittance and with and without use of manganese oxide.

TABLE III

| Example | 1 | 2 | 3 | 4 |
|---|---|---|---|---|
| Wt. % $Fe_2O_3$ | 0.5 | 0.5 | 0.5 | 0.5 |
| Wt. % FeO | 0.312 | 0.234 | 0.293 | 0.255 |
| Redox Ratio | 0.624 | 0.468 | 0.586 | 0.510 |
| Wt. % $MnO_2$ | 0 | 0.1 | 0.1 | 0.4 |
| Wt. % $CeO_2$ | | | | |
| Wt. % $TiO_2$ | | | | |
| Salt Cake* | 10 | 10 | 10 | 10 |
| Anthracite coal* | 2.08 | 1.67 | 2.08 | 2.08 |
| Graphite* | | | | |
| Melite* | | | | |
| Spectral Properties @ 4.0 mm. control thickness | | | | |
| % LTA | 67.3 | 75.46 | 71.37 | 73.41 |
| % UV | 42.02 | 57.14 | 56.35 | 57.38 |
| % IR | 13.62 | 21.48 | 15.14 | 18.79 |
| % TSET | 36.1 | 46.41 | 40.63 | 44.14 |
| Dominant wavelength | 549.8 | 490.3 | 493.5 | 490.1 |
| % Excitation Purity | 7.7 | 6 | 6.2 | 7.2 |
| Most Preferred Embodiment of Invention with Spectral Properties @ indicated thickness | | | | |
| Thickness in mm. | | 5.4 | 4.2 | 4.8 |
| % LTA | | 70.7 | 70.6 | 70.67 |
| % UV | | 51.3 | 55.4 | 53.75 |
| % IR | | 13.4 | 14.1 | 13.96 |
| % TSET | | 39.6 | 39.6 | 39.97 |
| Dominant Wavelength | | 490.2 | 493.5 | 490 |
| % Excitation Purity | | 8 | 6.4 | 8.6 |

*pounds per 1000 pounds sand

Table IV demonstrates further improvements in infrared absorption by increasing anthracite coal and in ultra violet absorption when $MnO_2$ is increased at constant $Fe_2O_3$. Generally, as anthracite coal is increased infrared absorption is increased while as manganese dioxide is increased the ultra violet absorption is increased.

TABLE IV

| Example | 5 | 6 | 7 | 8 | 9 |
|---|---|---|---|---|---|
| Wt. % $Fe_2O_3$ | 0.5 | 0.5 | 0.5 | 0.5 | 0.5 |
| Wt. % FeO | 0.2 | 0.249 | 0.198 | 0.241 | 0.276 |
| Redox Ratio | 0.400 | 0.498 | 0.396 | 0.482 | 0.552 |
| Wt. % $MnO_2$ | 0.05 | 0.05 | 0.45 | 0.45 | 0.45 |
| Wt. % $CeO_2$ | | | | | |
| Wt. % $TiO_2$ | | | | | |
| Salt Cake* | 10 | 10 | 10 | 10 | 10 |
| Anthracite coal* | 1.44 | 1.67 | 1.67 | 2 | 2.22 |
| Graphite* | | | | | |
| Melite* | | | | | |
| Spectral Properties @ 4.0 mm. control thickness | | | | | |
| % LTA | 76.96 | 74.56 | 75.36 | 74 | 72.32 |
| % UV | 57.94 | 59.99 | 50.56 | 54.85 | 55.79 |
| % IR | 26.03 | 19.51 | 26.33 | 20.41 | 16.63 |
| % TSET | 49.61 | 45.12 | 48.54 | 45.01 | 42.08 |
| Dominant wavelength | 490.1 | 488.8 | 493.4 | 490.8 | 491.3 |
| % Excitation Purity | 5.7 | 7.8 | 4.7 | 6.6 | 7.1 |
| Most Preferred Embodiment of Invention with Spectral Properties @ indicated thickness | | | | | |
| Thickness in mm. | | | | 5 | 4.4 |
| % LTA | | | | 70.27 | 70.7 |
| % UV | | | | 50.16 | 53.9 |
| % IR | | | | 14.35 | 14.4 |

TABLE IV-continued

| Example | 5 | 6 | 7 | 8 | 9 |
|---|---|---|---|---|---|
| % TSET | | | | 39.81 | 40 |
| Dominant Wavelength | | | | 490.7 | 491.3 |
| % Excitation Purity | | | | 8.2 | 7.8 |

*pounds per 1000 pounds sand

Table V demonstrates that slag from coal burning facilities, for example, MELITE processed by Calumite Corporation can be used as a partial or complete substitute for rouge to generate products within the scope of the invention. MELITE contains iron oxide where approximately 80% of the iron oxide is in the reduced form while about 98% of the iron is rouge is in the oxidized form. Less anthracite coal is required to reduce the glass batch using MELITE than batch with rouge.

TABLE V

| Example | 10 | 11 | 12 | 13 |
|---|---|---|---|---|
| Wt. % $Fe_2O_3$ | 0.5 | 0.5 | 0.5 | 0.5 |
| Wt. % FeO | 0.208 | 0.236 | 0.255 | 0.303 |
| Redox Ratio | 0.416 | 0.472 | 0.510 | 0.606 |
| Wt. % $MnO_2$ | 0.1 | 0.1 | 0.1 | 0.1 |
| Wt. % $CeO_2$ | | | | |
| Wt. % $TiO_2$ | | | | |
| Salt Cake* | 10.5 | 10.5 | 10.5 | 10.5 |
| Anthracite coal* | 1.05 | 1.16 | 1.31 | 1.5 |
| Graphite* | | | | |
| Melite* | 34.2 | 34.2 | 34.2 | 34.2 |
| Spectral Properties @ 4.0 mm. control thickness | | | | |
| % LTA | 74.89 | 73.64 | 72.93 | 69.85 |
| % UV | 54.37 | 55.76 | 57.78 | 55.23 |
| % IR | 24.85 | 21.07 | 18.82 | 14.32 |
| % TSET | 47.86 | 45.34 | 43.91 | 39.57 |
| Dominant wavelength | 490.9 | 489.9 | 489.4 | 492.3 |
| % Excitation Purity | 5.8 | 7 | 7.7 | 7.2 |
| Most Preferred Embodiment of Invention with Spectral Properties @ indicated thickness | | | | |
| Thickness in mm. | | | | 3.9 |
| % LTA | | | | 70.3 |
| % UV | | | | 55.7 |
| % IR | | | | 14.9 |
| % TSET | | | | 40 |
| Dominant Wavelength | | | | 492.3 |
| % Excitation Purity | | | | 7 |

*pounds per 1000 pounds sand

Table VI shows that graphite can be used to substitute for anthracite coal in glass of the invention. Other carbonaceous materials could substitute for anthracite coal or graphite where the ratio of carbon content would be compared to that of graphite or anthracite coal.

TABLE VI

| Example | 14 | 15 | 16 | 17 | 18 | 19 |
|---|---|---|---|---|---|---|
| Wt. % $Fe_2O_3$ | 0.55 | 0.55 | 0.55 | 0.65 | 0.65 | 0.65 |
| Wt. % FeO | 0.207 | 0.226 | 0.249 | 0.27 | 0.271 | 0.295 |
| Redox Ratio | 0.376 | 0.411 | 0.453 | 0.415 | 0.417 | 0.454 |
| Wt. % $MnO_2$ | 0.1 | 0.1 | 0.1 | 0.1 | 0.1 | 0.1 |
| Wt. % $CeO_2$ | | | | | | |
| Wt. % $TiO_2$ | | | | | | |

TABLE VI-continued

| Example | 14 | 15 | 16 | 17 | 18 | 19 |
|---|---|---|---|---|---|---|
| Salt Cake* | 10 | 10 | 10 | 10 | 10 | 10 |
| Anthracite coal* | | | | | | |
| Graphite* | 1.17 | 1.25 | 1.34 | 1.18 | 1.25 | 1.33 |
| Melite* | | | | | | |
| Spectral Properties @ 4.0 mm. control thickness | | | | | | |
| % LTA | 75.87 | 74.44 | 73.61 | 72.15 | 71.76 | 71.12 |
| % UV | 55.82 | 56.7 | 57.56 | 52.13 | 51.94 | 53.71 |
| % IR | 25.01 | 22.32 | 19.44 | 17.27 | 17.19 | 14.96 |
| % TSET | 48.47 | 46.59 | 44.58 | 42.47 | 42.24 | 40.87 |
| Dominant wavelength | 490.6 | 489.8 | 489.2 | 490.1 | 490.1 | 489.4 |
| % Excitation Purity | 5.7 | 6.5 | 7.5 | 7.4 | 7.5 | 8.5 |
| Most Preferred Embodiment of Invention with Spectral Properties @ indicated thickness | | | | | | |
| Thickness in mm. | | 4.9 | | | 4.4 | 4.2 |
| % LTA | | 70.3 | | | 70.1 | 70.5 |
| % UV | | 53.6 | | | 50 | 53.8 |
| % IR | | 14 | | | 15 | 13.9 |
| % TSET | | 39.9 | | | 39.9 | 39.9 |
| Dominant Wavelength | | 489.1 | | | 490 | 489.4 |
| % Excitation Purity | | 9 | | | 8.2 | 8.9 |

*pounds per 1000 pounds sand

Table VII indicates the impact of salt cake in glass of the invention. Salt cake is used to remove gaseous inclusions, from the glass in the furnace by growing bubbles larger, bubbles rising to the surface and then breaking open at the melt surface and releasing the accumulated gases. Increasing salt cake in the batch tends to oxidize the glass and requires increasing anthracite coal. Excess use of salt cake is discouraged because the excess salt cake releases $SO_x$ emissions. Other sulfates can substitute for salt cake in glass of the invention.

TABLE VII

| Example | 20 | 21 | 22 | 23 |
|---|---|---|---|---|
| Wt. % $Fe_2O_3$ | 0.5 | 0.5 | 0.5 | 0.5 |
| Wt. % FeO | 0.257 | 0.291 | 0.204 | 0.24 |
| Redox Ratio | 0.514 | 0.582 | 0.408 | 0.480 |
| Wt. % $MnO_2$ | 0.1 | 0.45 | 0.1 | 0.45 |
| Wt. % $CeO_2$ | | | | |
| Wt. % $TiO_2$ | | | | |
| Salt Cake* | 10 | 10 | 15 | 15 |
| Anthracite coal* | 1.9 | 2.11 | 1.82 | 2.22 |
| Graphite* | | | | |
| Melite* | | | | |
| Spectral Properties @ 4.0 mm. control thickness | | | | |
| % LTA | 73.89 | 71.18 | 76.46 | 74.19 |
| % UV | 58.57 | 54.25 | 56.91 | 54.93 |
| % IR | 18.66 | 15.34 | 25.44 | 20.57 |
| % TSET | 44.25 | 40.69 | 48.99 | 45.19 |
| Dominant wavelength | 489.2 | 492.5 | 490.4 | 490.9 |
| % Excitation Purity | 7.8 | 6.7 | 5.7 | 6.5 |

TABLE VII-continued

| Example | 20 | 21 | 22 | 23 |
|---|---|---|---|---|
| Most Preferred Embodiment of Invention with Spectral Properties @ indicated thickness | | | | |
| Thickness in mm. | 5 | 4.2 | 6 | 5 |
| % LTA | 70.16 | 70.3 | 70.05 | 70.05 |
| % UV | 54.34 | 53.5 | 48.75 | 50.27 |
| % IR | 12.87 | 14.3 | 13.94 | 14.49 |
| % TSET | 39.23 | 39.6 | 39.49 | 39.98 |
| Dominant Wavelength | 489.1 | 492.5 | 490.2 | 490.8 |
| % Excitation Purity | 9.6 | 6.9 | 8.5 | 8 |

*pounds per 1000 pounds sand

Table VIII indicates the wide range of $Fe_2O_3$ that can be used to demonstrate the instant invention. Products that follow the teachings of the, instant invention can vary in thickness from 1.5 to 8.0 mm. and can be used in architectural as well as automotive applications. Automotive applications include laminated products such as windshields.

TABLE VIII

| Example | 24 | 25 | 26 | 27 | 28 | 28 |
|---|---|---|---|---|---|---|
| Wt. % $Fe_2O_3$ | 0.3 | 0.35 | 0.45 | 0.6 | 0.65 | 0.7 |
| Wt. % FeO | 0.152 | 0.179 | 0.213 | 0.334 | 0.321 | 0.352 |
| Redox Ratio | 0.507 | 0.511 | 0.473 | 0.557 | 0.494 | 0.503 |
| Wt. % $MnO_2$ | 0.1 | 0.1 | 0.1 | 0.1 | 0.1 | 0.1 |
| Wt. % $CeO_2$ | | | | | | |
| Wt. % $TiO_2$ | | | | | | |
| Salt Cake* | 10 | 10 | 10 | 10 | 10 | 10 |
| Anthracite coal* | 1.81 | 1.82 | 1.81 | 2.01 | 1.82 | 1.82 |
| Graphite* | | | | | | |
| Melite* | | | | | | |
| Spectral Properties @ 4.0 mm. control thickness | | | | | | |
| % LTA | 80.34 | 78.75 | 76.65 | 69.26 | 69.01 | 67.83 |
| % UV | 68.86 | 66.43 | 61.33 | 54.3 | 51.57 | 50.85 |
| % IR | 34.96 | 29.66 | 24.13 | 11.97 | 12.87 | 10.87 |
| % TSET | 56.35 | 52.77 | 48.55 | 38.08 | 38.63 | 36.97 |
| Dominant wavelength | 488.9 | 488.7 | 489.6 | 490.7 | 489.2 | 489.2 |
| % Excitation Purity | 4.9 | 5.7 | 6.2 | 8.6 | 9.4 | 10.1 |
| Most Preferred Embodiment of Invention with Spectral Properties @ indicated thickness | | | | | | |
| Thickness in mm. | 7.2 | 6 | 3.7 | 3.5 | 4.2 | |
| % LTA | 70.1 | 70.32 | 70.7 | 70 | 70.4 | |
| % UV | 56.8 | 53.97 | 55.8 | 53.7 | 53.6 | |
| % IR | 13 | 12.91 | 13.8 | 14.1 | 14 | |
| % TSET | 39.5 | 39.27 | 39.7 | 39.8 | 40 | |
| Dominant Wavelength | 488.4 | 489.5 | 490.7 | 489.3 | 489.2 | |
| % Excitation Purity | 10.1 | 9.1 | 7.9 | 9.1 | 8.9 | |

*pounds per 1000 pounds sand

Table IX indicates the improvement in ultra violet absorption that cerium oxide makes. Cerium oxide by itself does not sufficiently increase the ultra violet absorption alone but as manganese dioxide increases, the ultra violet absorption again increases.

TABLE IX

| Example | 30 | 31 | 32 | 33 | 34 | 35 | 36 | 37 | 38 |
|---|---|---|---|---|---|---|---|---|---|
| Wt. % $Fe_2O_3$ | 0.5 | 0.5 | 0.7 | 0.8 | 0.5 | 0.5 | 0.5 | 0.5 | 0.5 |
| Wt. % FeO | 0.286 | 0.25 | 0.309 | 0.357 | 0.275 | 0.283 | 0.25 | 0.251 | 0.203 |
| Redox Ratio | 0.572 | 0.500 | 0.441 | 0.446 | 0.550 | 0.566 | 0.500 | 0.502 | 0.406 |
| Wt. % $MnO_2$ | 0.06 | 0.12 | 0.4 | 0.4 | 0.45 | 0.05 | 0.45 | 0.05 | 0.45 |
| Wt. % $CeO_2$ | 0.5 | 0.5 | 0.5 | 0.5 | 0.2 | 0.4 | 0.4 | 0.8 | 0.8 |
| Wt. % $TiO_2$ | | | | | | | | | |
| Salt Cake* | 10.5 | 10.5 | 10.5 | 10.5 | 10 | 10 | 10 | 10 | 10 |
| Anthracite coal* | 2.1 | 2.1 | 2.1 | 2.1 | 2.22 | 2 | 2.22 | 2 | 2.23 |
| Graphite* | | | | | | | | | |
| Melite* | | | | | | | | | |
| Special Properties @ 4.0 mm. control thickness | | | | | | | | | |
| % LTA | 72.21 | 74.58 | 68.32 | 65.22 | 72.46 | 72.3 | 72.77 | 73.68 | 75.58 |
| % UV | 47.46 | 48.91 | 38.04 | 35.32 | 50.32 | 48.48 | 45.47 | 45.74 | 41.37 |
| % IR | 15.81 | 19.47 | 13.78 | 10.56 | 16.77 | 16.02 | 19.31 | 19.22 | 25.58 |
| % TSET | 41.37 | 44.75 | 38.12 | 34.83 | 42.17 | 41.49 | 43.49 | 44.11 | 47.97 |
| Dominant Wavelength | 491.2 | 489.5 | 492.3 | 492.3 | 490.6 | 491.6 | 491.5 | 489.4 | 493.9 |
| % Excitation Purity | 7.1 | 7.3 | 7.3 | 8.2 | 7.4 | 7 | 6.5 | 7.5 | 4.6 |

*pounds per 1000 pounds sand

Lowering the ultra violet transmittance below 50% at 4.0 mm. control thickness requires greater than 0.2 wt. % $MnO_2$ and greater than 0.2 wt. % $CeO_2$ or the total of the components manganese dioxide and cerium, oxide to be 0.45 wt. % or greater.

Table X shows the improvement in ultra violet absorption made by the addition of titanium dioxide and that the dominant wavelength increases toward a green color. Titanium dioxide is capped at 0.3 wt. %. There is a trace amount of titanium dioxide in the sands that adds about 0.01. wt. % $TiO_2$ to the glass composition.

TABLE X

| Example | 39 | 40 | 41 | 42 | 43 |
|---|---|---|---|---|---|
| Wt. % $Fe_2O_3$ | 0.5 | 0.5 | 0.5 | 0.5 | 0.5 |
| Wt. % FeO | 0.239 | 0.238 | 0.261 | 0.26 | 0.253 |
| Redox Ratio | 0.478 | 0.476 | 0.522 | 0.520 | 0.506 |
| Wt. % $MnO_2$ | 0.2 | 0.2 | 0.2 | 0.2 | 0.4 |
| Wt. % $CeO_2$ | | | | | |
| Wt. % $TiO_2$ | Tramp | 0.05 | 0.1 | 0.2 | 0.3 |
| Salt Cake* | 10 | 10 | 10 | 10 | 10.5 |
| Anthracite coal* | 1.9 | 1.9 | 1.9 | 1.9 | 2.1 |
| Graphite* | | | | | |
| Melite* | | | | | |
| Spectral Properties @ 4.0 mm. control thickness | | | | | |
| % LTA | 75.22 | 74.68 | 73.82 | 73.6 | 73.35 |

TABLE X-continued

| Example | 39 | 40 | 41 | 42 | 43 |
|---|---|---|---|---|---|
| % UV | 59.38 | 57.34 | 57.52 | 55.12 | 50.08 |
| % IR | 20.77 | 20.79 | 18.25 | 18.33 | 19.13 |
| % TSET | 46.05 | 45.7 | 43.84 | 43.61 | 43.58 |
| Dominant wavelength | 489.4 | 490 | 490.4 | 491.5 | 494 |
| % Excitation Purity | 7.1 | 6.8 | 7.1 | 6.5 | 5.5 |
| Most Preferred Embodiment of Invention with Spectral Properties @ indicated thickness | | | | | |
| Thickness in mm. | 5.5 | 5.1 | 5 | 4.8 | 4.8 |
| % LTA | 70.1 | 70.5 | 70.07 | 70.55 | 70.25 |
| % UV | 53.4 | 52.5 | 53.02 | 51.22 | 45.78 |
| % IR | 12.6 | 14.1 | 12.52 | 13.57 | 14.26 |
| % TSET | 39 | 40 | 38.8 | 39.42 | 39.28 |
| Dominant Wavelength | 489.2 | 489.9 | 490.3 | 491.4 | 493.9 |
| % Excitation Purity | 9.6 | 8.6 | 8.8 | 7.8 | 6.5 |

*pounds per 1000 pounds sand

Table XI indicates the ultraviolet absorption improvements when cerium oxide and titanium dioxide are used in combination. Lowering the ultra violet transmittance below 50% at 4.0 mm. control thickness requires greater than 0.05 wt. % $MnO_2$, greater than 0.2 wt. % $CeO_2$ and greater than 0.1 wt. % $TiO_2$ or the total of the components manganese dioxide, cerium oxide and titanium dioxide to be 0.55 wt. % or greater.

TABLE XI

| Example | 44 | 45 | 46 | 47 | 48 | 49 | 50 | 51 |
|---|---|---|---|---|---|---|---|---|
| Wt. % $Fe_2O_3$ | 0.5 | 0.5 | 0.5 | 0.5 | 0.5 | 0.5 | 0.5 | 0.5 |
| Wt. % FeO | 0.263 | 0.246 | 0.255 | 0.254 | 0.25 | 0.261 | 0.231 | 0.255 |
| Redox Ratio | 0.526 | 0.492 | 0.510 | 0.508 | 0.500 | 0.522 | 0.462 | 0.450 |
| Wt. % $MnO_2$ | 0.12 | 0.05 | 0.15 | 0.2 | 0.2 | 0.2 | 0.2 | 0.2 |
| Wt. % $CeO_2$ | 0.5 | 0.25 | 0.25 | 0.025 | 0.05 | 0.1 | 0.2 | 0.3 |
| Wt. % $TiO_2$ | 0.1 | 0.25 | 0.25 | 0.025 | 0.05 | 0.1 | 0.2 | 0.1 |
| Salt Cake* | 10.5 | 10.5 | 10 | 10 | 10 | 10 | 10 | 10 |
| Anthracite coal* | 2.1 | 1.75 | 1.91 | 1.9 | 1.9 | 1.9 | 1.9 | 1.9 |
| Spectral Properties @ 4.0 mm. control thickness | | | | | | | | |
| % LTA | 73.47 | 74.01 | 73.04 | 73.78 | 74.25 | 73.4 | 74.71 | 75.2 |
| % UV | 46.4 | 47.82 | 46.06 | 57.3 | 56.01 | 53.05 | 47.83 | 48.2 |

TABLE XI-continued

| Example | 44 | 45 | 46 | 47 | 48 | 49 | 50 | 51 |
|---|---|---|---|---|---|---|---|---|
| % IR | 18.03 | 19.8 | 18.7996 | 18.96 | 19.41 | 18.25 | 21.68 | 22.47 |
| % TSET | 43.22 | 44.4 | 43.27 | 44.32 | 44.72 | 43.52 | 45.71 | 46.47 |
| Dominant Wavelength | 490.6 | 491.4 | 492.2 | 489.5 | 489.7 | 490.5 | 492.3 | 491.2 |
| % Excitation Purity | 7 | 6.2 | 6.1 | 7.4 | 7.2 | 7.1 | 5.6 | 5.9 |
| Most Preferred Embodiment of Invention with Spectral Properties @ indicated thickness | | | | | | | | |
| Thickness in mm. | 4.8 | 5 | 4.8 | 5 | 5 | 4.8 | 5.2 | 5.5 |
| % LTA | 70.39 | 70.28 | 69.89 | 70.01 | 70.57 | 70.31 | 70.4 | 70.1 |
| % UV | 43.08 | 43.39 | 42.3 | 53.06 | 51.8 | 49.52 | 42.5 | 41.9 |
| % IR | 13.3 | 13.83 | 13.96 | 13.11 | 13.5 | 13.5 | 14.3 | 13.9 |
| % TSET | 39.08 | 39.23 | 39.01 | 39.25 | 39.65 | 39.36 | 39.4 | 39.2 |
| Dominant Wavelength | 490.6 | 491.4 | 492.2 | 489.4 | 489.7 | 490.4 | 492.3 | 491.1 |
| % Excitation Purity | 8.3 | 7.7 | 7.3 | 10.9 | 8.9 | 8.4 | 7.2 | 8 |

*pounds per 1000 pounds sand

As can be seen from the examples above, the glass in accordance with the present invention provides for high transmittance, an improved infrared light absorption and an ultra violet absorption. Further, the use of anthracite coal and magnesium dioxide shifts the iron oxide equilibrium towards the reduced form of iron (FeO). Manganese oxide also prevents excessive reduction of sulfate to form iron sulfide that is amber in color and will decrease the transmittance of the glass.

As any person skilled in the art will recognize from the previous description and from the figures and claims, modifications and changes can be made to the preferred embodiment of the invention without departing from the scope of the invention as defined in the following claims.

What is claimed is:

1. A colored glass for use in a motor vehicle having a base and a colorant, the colorant having a composition by weight of the colored glass consisting:
   0.3 to 0.8 wt. % of iron oxide as $Fe_2O_3$, wherein the redox ratio of FeO and total iron as $Fe_2O_3$ is in the range of 0.34 to 0.62;
   0.05 to 0.50 wt. % of manganese oxide as $MnO_2$;
   0.0 to 0.3 wt. % of titanium oxide as $TiO_2$; and
   up to 0.8 wt. % of cerium oxide as $CeO_2$, wherein the colored glass at 4 mm control thickness has a light transmittance using illuminant A greater than 68.0% and less than 81.0% and a dominant wavelength using illuminant C is in a range of 488 to 494 nanometers.

2. The colored glass of claim 1, wherein the colored glass at 4 mm thickness has an excitation purity in the range of 4% to 11%.

3. The colored glass of claim 1, wherein the dominant wavelength in the range of 488 to 491 nanometers.

4. The colored glass of claim 1, wherein the total iron as $Fe_2O_3$ is in the range of 0.4 to 0.6 wt %.

5. The colored glass of claim 1, wherein the manganese oxide as $MnO_2$ is in the range of 0.05 to 0.2 wt %.

6. The colored glass of claim 1, wherein the titanium oxide as $TiO_2$ is in the range of 0.05 to 0.3 wt %.

7. The colored glass of claim 1, wherein the cerium oxide as $CeO_2$ is in the range of 0.1 to 0.5 wt %.

8. The colored glass of claim 1, wherein the base has a composition by weight of the colored glass comprising:
   68 to 75% $SiO_2$;
   10 to 18% $Na_2O$;
   5 to 15% CaO;
   0 to 10% MgO;
   0 to 5% $Al_2O_3$; and
   0 to 5% $K_2O$,
   wherein the total amount of CaO and MgO is 6 to 15% and the total amount of $Na_2O$ and $K_2O$ is 10 to 20%.

9. A method of manufacturing an amber free blue glass, the method comprising:
   mixing and melting a pre-determined amount of raw material, wherein the raw materials has the following composition:

| | |
|---|---|
| Sand | 1000 lbs; |
| Soda Ash | 290 to 350 lbs; |
| Limestone | 70 to 90 lbs; |
| Dolomite | 215 to 260 lbs; |
| Salt cake | 5 to 15 lbs; |
| Rouge (97% $Fe_2O_3$) | 3.5 to 11.5 lbs; |
| Manganese Dioxide | 0.65 to 6.5 lbs; |
| Titanium Dioxide | 0 to 4.2 lbs; |
| Cerium Oxide | 0 to 11.5 lbs; |
| Nepheline Syenite | 0 to 150 lbs; and | adding 0.7 to 2.4 lbs per 1000 pounds of sand of a reductant to the pre-determined amount of raw material,
   wherein the amber free blue glass having a base and a colorant, the colorant having a composition by weight of the amber free blue glass consisting:
   0.3 to 0.8 wt. % of iron oxide as $Fe_2O_3$, wherein the redox ratio of FeO and total iron as $Fe_2O_3$ is in the range of 0.34 to 0.62;
   0.05 to 0.50 wt. %. of manganese oxide as $MnO_2$;
   0.0 to 0.3 wt. % of titanium oxide as $TiO_2$; and
   up to 0.8 wt. % of cerium oxide as $CeO_2$,
   wherein the reductant increases the amount of iron oxide in the amber free blue glass such that the spectral properties of the amber free blue glass at 4 mm. control thickness has a light transmittance using illuminant A between 65.0% and 81.0% and a dominant wavelength using illuminant C is in a range of 488 to 494 nanometers.

10. The method of claim 9, wherein the reductant is present in the range of 1.0 to 2.3 pounds per 1000 pounds of sand.

11. The method of claim 9, wherein the reductant is selected from a group consisting of anthracite coal, blast furnace slag, slag from coal fired furnace, coke, graphite or mixtures thereof.

12. The method of claim 9, wherein the colored glass at 4 mm. thickness has an excitation purity in the range of 4% to 11%.

13. The method of claim 9, wherein the dominant wavelength in the range of 488 to 491 nanometers.

14. The method of claim 9, wherein the total iron as $Fe_2O_3$ is in the range of 0.4 to 0.60 wt %.

15. The method of claim 9, wherein the manganese oxide as $MnO_2$ is in the range of 0.05 to 0.2 wt %.

16. The method of claim 9, wherein the titanium oxide as $TiO_2$ is in the range of 0.05 to 0.3 wt %.

17. The method of claim 9, wherein the cerium oxide as $CeO_2$ is in the range of 0.1 to 0.5 wt %.

18. The method of claim 9, wherein the base has a composition by weight of the colored glass by weight of the colored glass comprising:
- 68 to 75% $SiO_2$;
- 10 to 18% $Na_2O$;
- 5 to 15% CaO;
- 0 to 10% MgO;
- 0 to 5% $Al_2O_3$; and
- 0 to 5% $K_2O$,
    wherein the total amount of CaO and MgO is 6 to 15% and the total amount of $Na_2O$ and $K_2O$ is 10 to 20%.

* * * * *

UNITED STATES PATENT AND TRADEMARK OFFICE
CERTIFICATE OF CORRECTION

PATENT NO. : 6,596,660 B1
DATED : July 22, 2003
INVENTOR(S) : Edward Nashed Boulos et al.

It is certified that error appears in the above-identified patent and that said Letters Patent is hereby corrected as shown below:

<u>Title page,</u>
Item [56], References Cited, OTHER PUBLICATIONS,
"Journal of the Optical Society of America" reference, delete "Jun. 1948" and substitute -- received January 12, 1948 -- in its place; and
"Coloured Glasses," reference, delete "1951.".
Item [57], ABSTRACT
Line 8, after "$MnO_2$" delete "," (comma) and insert -- ; -- (semicolon).

Signed and Sealed this

Ninth Day of March, 2004

JON W. DUDAS
*Acting Director of the United States Patent and Trademark Office*